Sept. 18, 1956 G. FLYNN, JR 2,763,249
ENGINE GAS VALVE OPERATING MEANS
Filed June 16, 1952 5 Sheets-Sheet 1

Inventor
Gregory Flynn, Jr.
By Willits, Helwig & Baillio
Attorneys

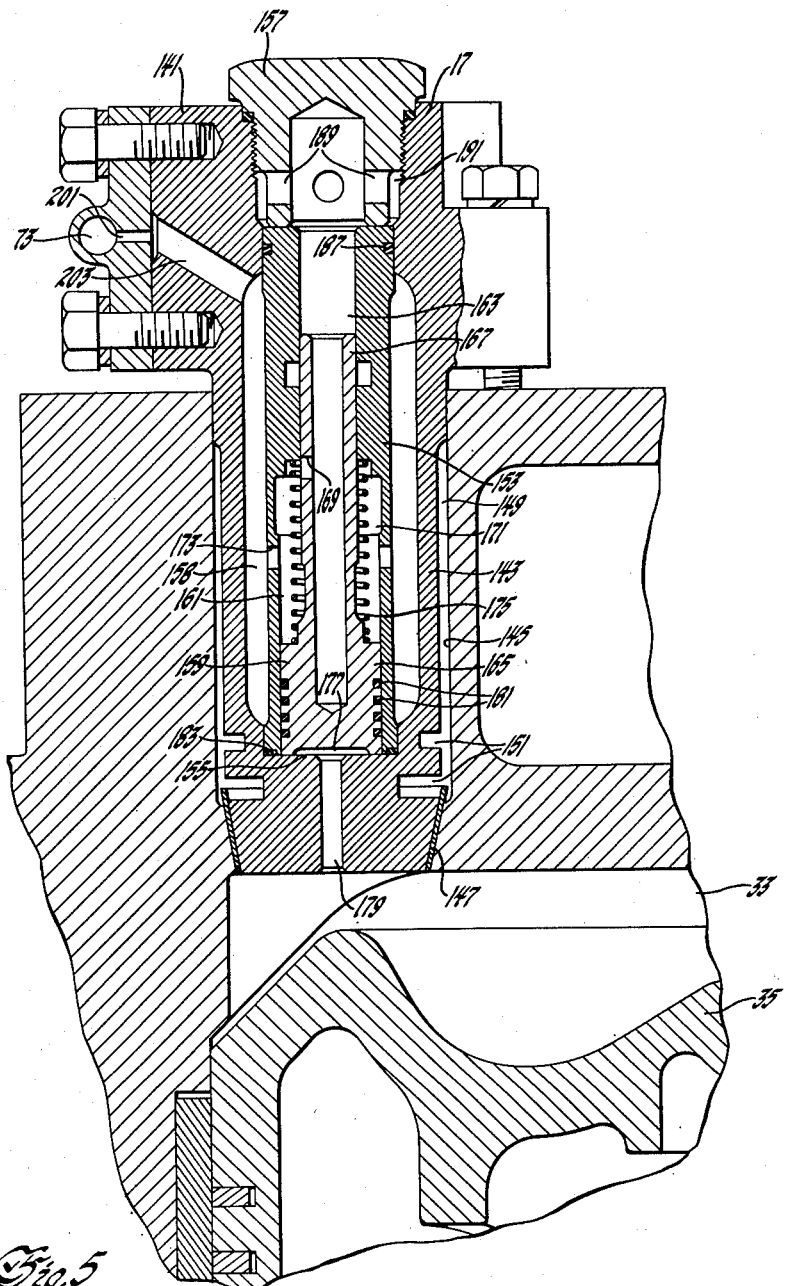

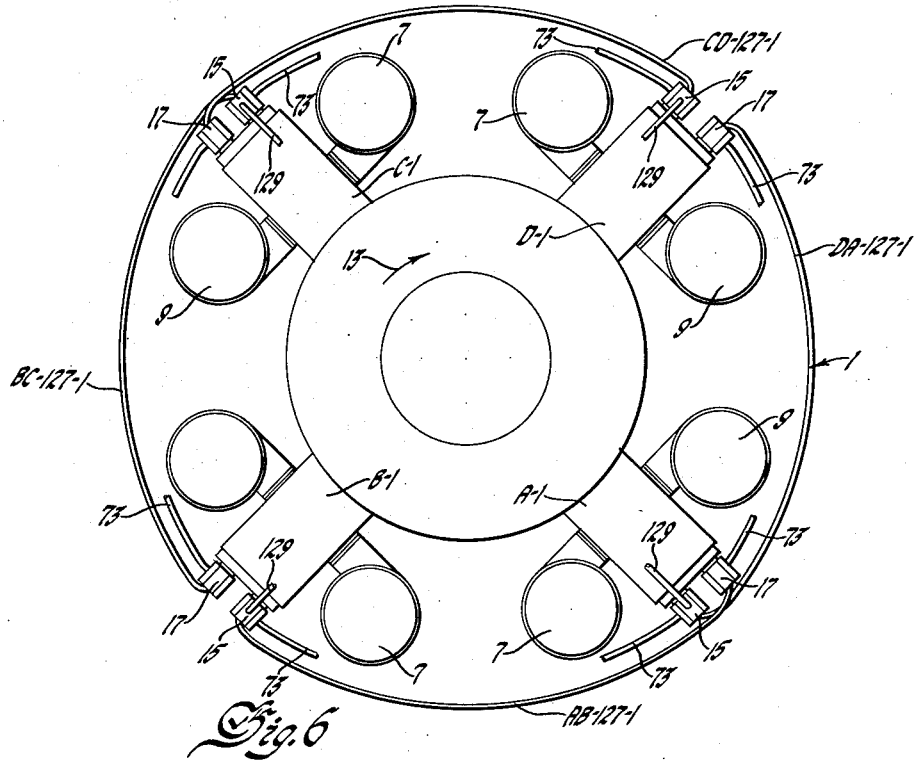
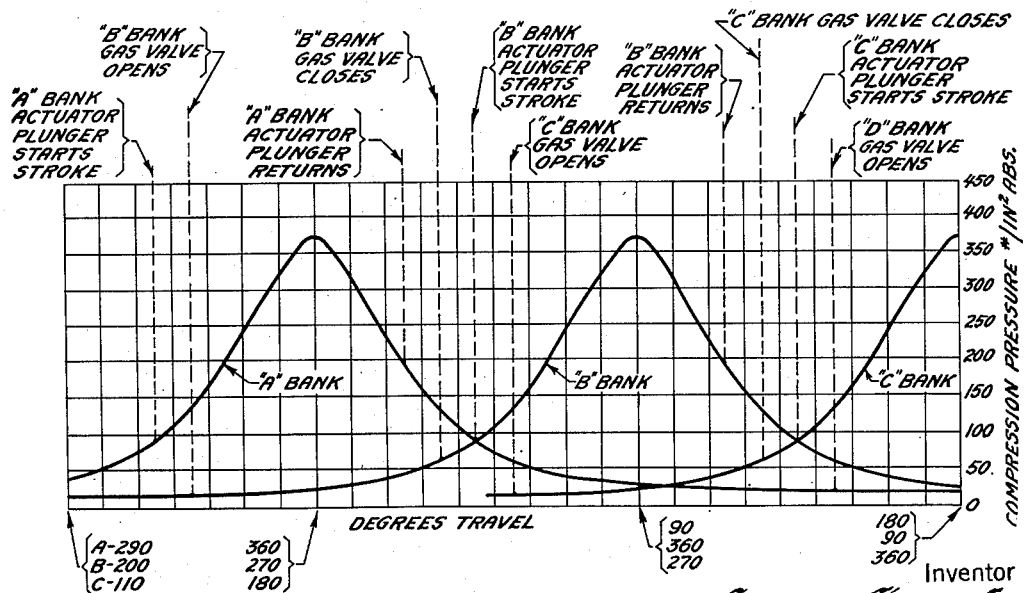

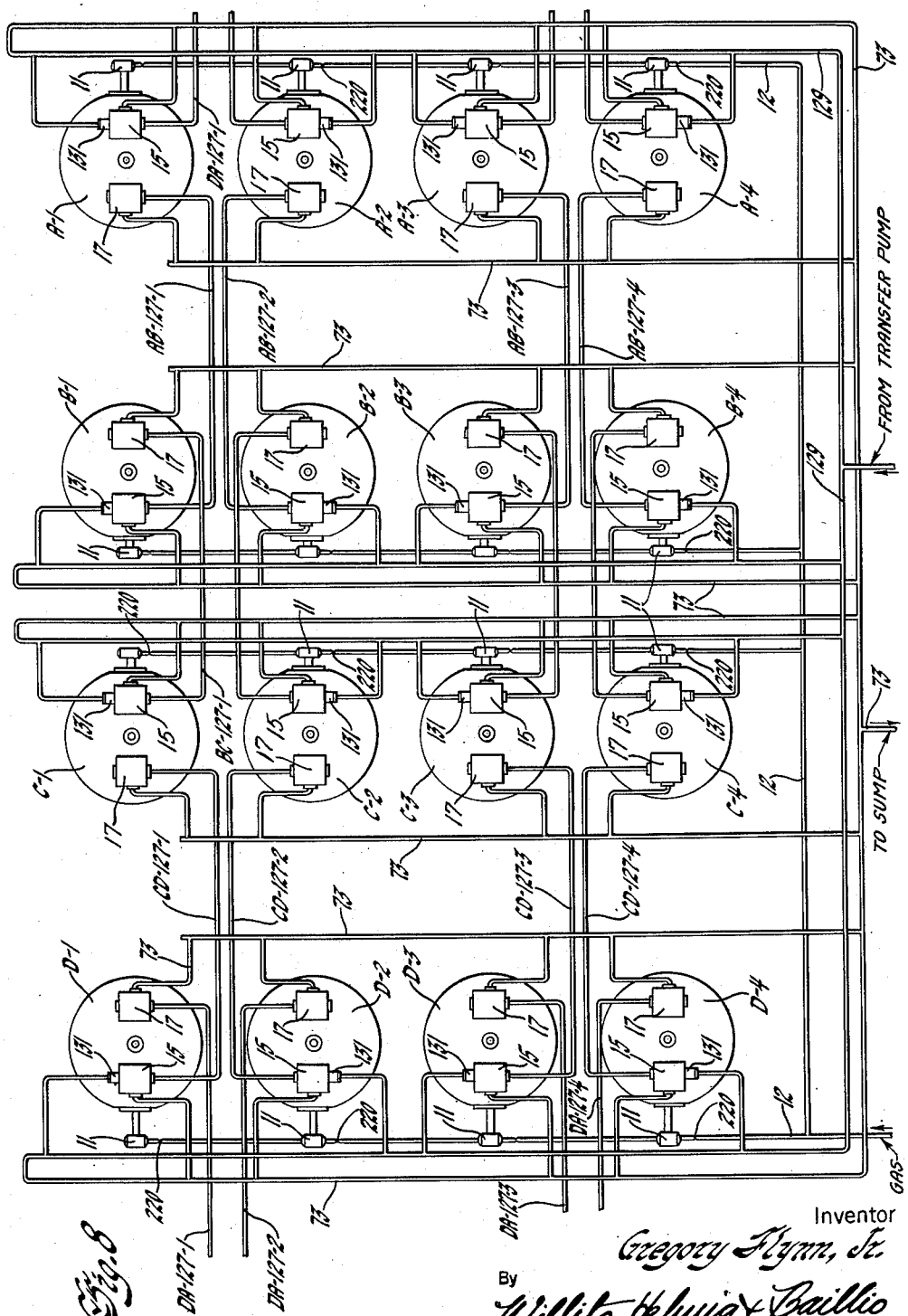

United States Patent Office 2,763,249
Patented Sept. 18, 1956

2,763,249

ENGINE GAS VALVE OPERATING MEANS

Gregory Flynn, Jr., Detroit, Mich., assignor to General Motors Corporation, Detroit, Mich., a corporation of Delaware Application June 16, 1952, Serial No. 293,808

8 Claims. (Cl. 123—90)

This invention relates to internal combustion engines and particularly to hydraulic operating means for operating the fuel admission valves of a multi-cylinder engine such as a four cylinder two-cycle radial engine.

Although the invention is applicable to other uses, for purposes of illustration it will be described with reference to a two-cycle engine having a plurality of rows of four cylinders per row, in each cylinder of which it is desired to introduce a charge of gaseous fuel during the compression stroke. The valves controlling the gas admission ports which open into the combustion chambers of the various cylinders are opened by oil pressure which is transmitted to suitable piston means associated with each gas valve from a driving or actuating piston responsive to the combustion chamber pressure in the adjacent earlier firing cylinder. Thus, the gas valves and the actuators therefor are interconnected by hydraulic fluid lines such that the combustion chamber pressure in each cylinder controls and times the opening of the gas valve in a successively later firing cylinder. It is accordingly one of the principal objects to provide suitable means for so operating the gas admission valves of a multi-cylinder two-cycle engine.

In its broader aspects the invention provides certain improvements in hydraulic operating systems for valves and the like in which movement of an actuated member is effected through a column of oil or other relatively incompressible fluid by movement of a driving or actuating member. In such systems a common difficulty has been the fact that high surge pressures are developed in the hydraulic column, due to the natural elasticity of the conduit casing which confines the fluid, as well as the elasticity of the fluid itself under high pressures, plus the effect of inertia forces in the fluid during its reciprocating movements. While attempts have been made to eliminate such surges, as by providing a pressure relief valve at the actuating member end of the column, this has not proved satisfactory. One of the improvements in such systems which my invention provides is an arrangement whereby the build-up of hydraulic fluid pressure is limited at both ends of the column. I accomplish this by providing a pressure relief port in both the actuating member cylinder and the cylinder in which the actuated member operates. The port in the actuating member cylinder is normally open, allowing hydraulic fluid to "spill off" ahead of the actuating member during the initial portion of the draving stroke of the actuating member, but is closed by the actuating member as the same continues its movement in the driving direction. The relief port in the cylinder of the actuated member on the other hand is normally closed by the actuated member, and is uncovered after a certain predetermined movement of this member to allow excess hydraulic fluid pressure to be relieved. As a further means for limiting hydraulic pressure build-up at the actuating member end, the actuating member and its cylinder are designed to provide a hydraulic stop which limits the driving stroke of the actuating member in its cylinder. A further object of the invention, therefore, is to provide a hydraulic operating system for transmission of linear motion between the actuating and actuated member, characterized by means at both ends of the hydraulic column for limiting the build-up of hydraulic pressure, whereby pressure surges in the column are avoided.

It is of course necessary in such hydraulic operating systems to provide for replenishing the hydraulic fluid to make up for leakage losses, and also to maintain the hydraulic column substantially free of any gas or air which may tend to enter the same and detract from its normal non-compressibility. In applying such a system to an internal combustion engine wherein the actuating piston is exposed to and driven by the compression and explosion pressures developed in the engine combustion chamber, there is an inherent tendency for air and combustion gases to leak past the actuating piston and aerate the hydraulic fluid in the transmission line. It is one of the features and objects of my invention to introduce the make-up oil or other hydraulic fluid at the actuated member end of the column, as I have found that this accomplishes the two-fold purpose of providing the necessary replenishment for the oil leakage and also serves to drive all aerated oil out of the actuating member end of the column.

Since certain portions of the actuating unit, as applied to an internal combustion engine in accordance with my invention, are necessarily subject to the heat of engine combustion, it is desirable that suitable means be provided for cooling the actuating plunger or piston and its cylinder to prevent their excessive wear and possible seizure in operation. It is a further object of the invention therefore to obtain this cooling by providing suitable passages within and surrounding the actuating member piston and cylinder through which hydraulic fluid from the column is passed for return to the source of supply of the aforesaid make-up fluid between each operating stroke of the actuating member.

A specific illustrative embodiment wherein these and other objects of the invention are accomplished will now be described, having reference to the drawings wherein:

Figure 5 is an enlarged sectional view taken substantially on line 5—5 of Figure 2, similarly showing the details of a representative actuating unit in association with the engine cylinder head and piston.

Figure 6 is a diagrammatic plan view of the engine taken from line 6—6 of Figure 1 and showing the interconnecting piping between the gas valve and actuator units of the top row of cylinders.

Figure 7 is a timing diagram showing the relative firing order of adjacent cylinders in one representative row.

Figure 8 is a diagrammatic 360° development of all sixteen engine cylinders, showing the interconnecting piping between gas valve and actuator units, make-up fluid supply and fluid return systems, and the gas supply manifolding to the various cylinders.

Figure 1:
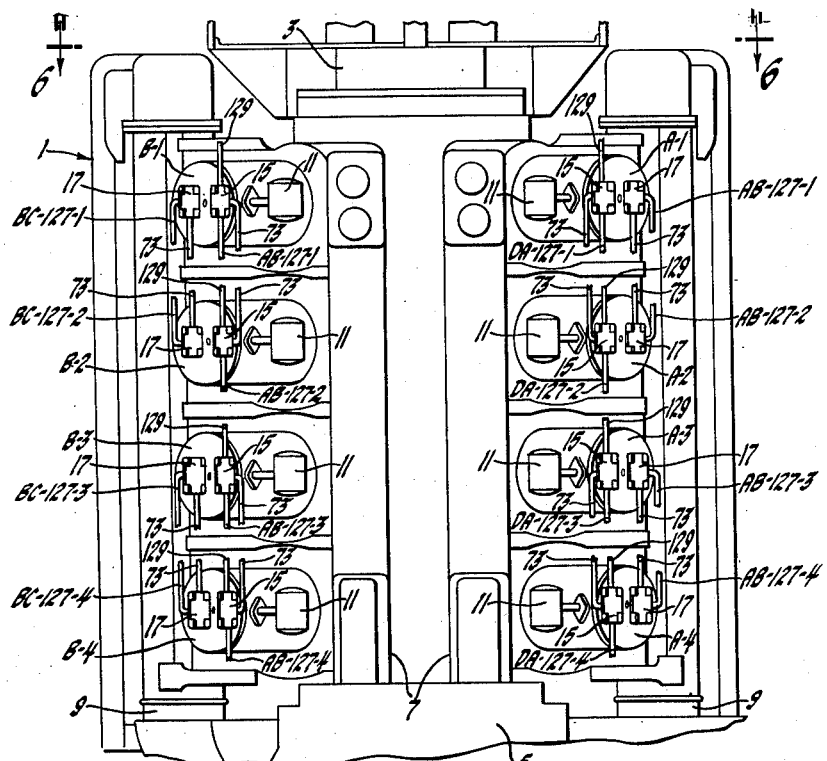
Figure 1 is a generally diagrammatic side elevational view of a vertical crankshaft, sixteen cylinder, internal combustion engine having four rows of four radial cylinders per row, each cylinder incorporating in its head end an actuator unit and a gas valve unit constructed and arranged in accordance with the invention.

Referring now in detail to the drawings, and first particularly to Figure 1, the numeral 1 designates generally a two-cycle four row radial engine having four rows of four cylinders each. The cylinders in each row radiate about a common vertical crankshaft (not shown), the upper end of which is connected to operate the necessary engine accessories through suitable gearing contained in a housing 3. The lower driving end of the crankshaft may be connected directly to an electrical generator indicated at 5. The cylinders of the particular engine illustrated are arranged for loop scavenging, with the scavenging air being supplied by the manifolds 7, and the exhaust being conducted from the cylinders by exhaust manifolds 9. The engine is designed to operate on gas fuel which is conducted to the various cylinders by manifolds 12 (shown in Figure 8) which feed individual cylinder accumulator tanks 11 from which the gas is piped into the cylinder heads for admission to the cylinder combustion chambers upon opening of poppet gas valves, one of which is mounted in each cylinder head and is controlled and operated in proper engine firing sequence by means hereinafter described.

For purposes of identification, the various cylinders in the uppermost row are designated A–1, B–1, C–1 and D–1; those in the second or next lower row being A–2, B–2, C–2 and D–2; etc. for the cylinders of the third and fourth rows.

Figure 2:
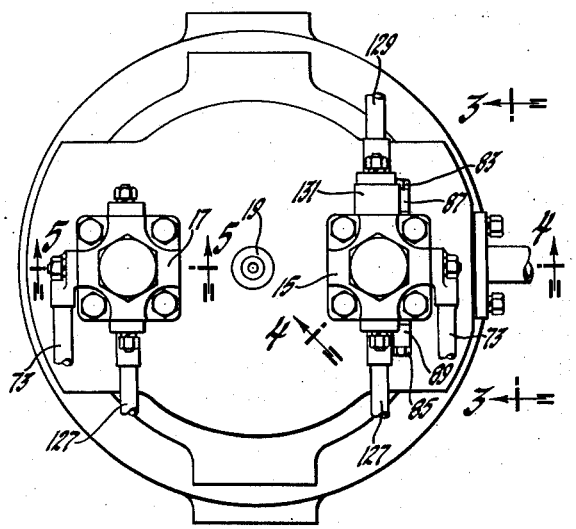
Figure 2 is an enlarged end view of a representative cylinder showing the cylinder head with the gas valve and actuator units mounted therein in elevation.
Figure 3:
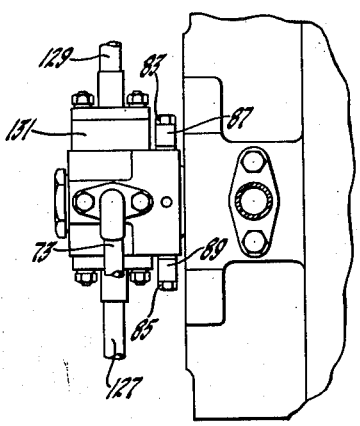
Figure 3 is a side elevational view taken from line 3—3 of Figure 2.

Referring to Figure 6, the rotation of the engine crankshaft is in the direction indicated by the arrow 13, whereby cylinder A–1 fires first, followed in order by B–1, C–1 and D–1. Mounted in the head of each cylinder is a gas valve unit 15 and a gas valve actuator unit 17. As best shown in Figure 2, these units are located on diametrically opposite sides of an igniter means 19 which may take the form either of a spark plug or a fuel injector, depending on whether the engine is to be operated on straight gas fuel or as a dual fuel engine.

Figure 4:
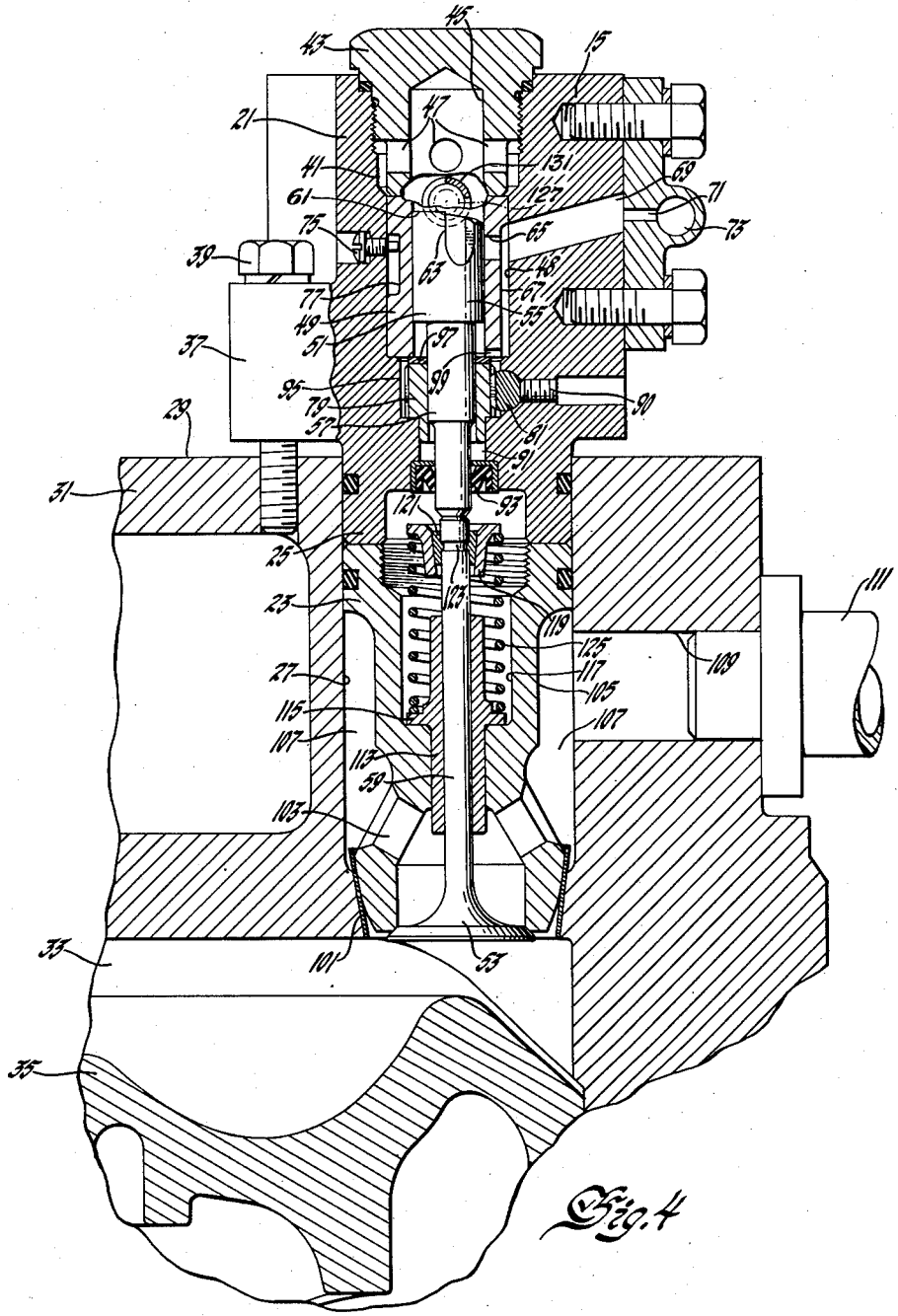
Figure 4 is an enlarged sectional view taken substantially on line 4—4 of Figure 2 and showing the details of a representative gas valve unit in association with the head and piston of its engine cylinder.

Referring to Figure 4, it will be seen that the gas valve unit 15 comprises upper and lower housing sections 21 and 23, the upper section terminating at its lower end in a reduced portion 25 closely fitting an opening 27 which extends from the upper, outer face 29 of the cylinder head 31 to the combustion chamber 33 of the engine working cylinder in which is mounted the usual engine piston 35. The gas valve housing upper section 21 is rigidly secured in place by volts or studs 39 which extend through its upper or head portion 37 and anchor in threaded holes in the upper face 29 of the cylinder head. This upper housing section head portion 37 is provided with an internal oil receiving chamber 41 closed at its upper end by a threaded plug 43 whose lower end is formed with a downwardly open internal chamber 45 which communicates with the chamber 41 by a plurality of transverse side wall ports 47. Below the chamber 41 the housing section is provided with a second chamber 48 in which is fitted a bushing 49 forming a cylinder for the driven plunger 51 which operates the gas fuel poppet valve 53 reciprocably mounted in the housing lower section 23. The driven plunger 51 is in the form of a piston valve having an upper piston portion 55 and a lower depending stem 57 which abuts the stem 59 of the valve 53. The upper end of the piston portion 55 is generally cup-shaped with the upper edge 61 of the cup having a helical contour extending in opposite directions from a notch 63 formed in the side wall of the cup. In its normal position, as shown in Figure 4, with the valve 53 closed, the lowermost portion of the helical edge 61 extends upwardly in the bushing 49 sufficiently to overlap a side relief port 65 provided in the wall of this bushing. The outer end of this port 65 terminates in a longitudinal slot 67 formed in the outer periphery of the bushing 49 and extending to the lower end of the chamber 48. The upper end of the slot 67 registers with a transverse passage 69 leading outward through the wall of the upper housing upper section head portion 37 and bolted to that side of the housing head portion is an adapter having a passage 71 which connects the passage 69 with a hydraulic fluid return conduit system 73.

This fluid return conduit system 73, of which only a portion is shown in Figure 4, serves all of the gas valve and actuator units of the various engine cylinders and leads to a sump as indicated diagrammatically in Figure 8.

The bushing 49 (Figure 4) is held seated in the bottom of the chamber 48 by the plug 43, and angular alignment of the passage 65 and slot 67 of this bushing with the housing passage 69 is insured by a locating screw 75 threaded in the wall of the housing 21 and terminating at its inner end in engagement with an external slot 77 provided in the side wall of the bushing. Splined or otherwise suitably keyed to the stem 57 of the driven plunger 51 is an externally toothed pinion 79 which meshes with a transversely extending rack 81. This rack is slidably adjustable longitudinally of its axis in a passage provided therefor in the housing and the opposite ends of the rack are threadedly received in cap nuts 87 and 89 having hexagonal flats 83 and 85. Suitable gaskets, as shown, are provided between the sides of the housing and the base of each of these nuts to seal against the escape of hydraulic fluid at those points. By loosening one of the nuts 87, 89 and simultaneously tightening the other, the rack may be adjusted longitudinally of its axis to effect rotation of the pinion 79 and the driven plunger 51. The rack 81, for convenience in manufacture, is made cylindrical in transverse section and is formed with a flat side opposite the pinion. A pin or set screw 90 fixed in the housing section wall has a flat inner end face which slidably bears against this flat side of the rack to prevent the latter from rotating out of proper meshing relation with the pinion. The pinion 79 is journalled at its lower end in a bore 91 concentric with the bushing 49. The bore 91 is counterbored at its lower end to receive a sealing element 93 which serves to prevent leakage of air and combustion gas upwardly of the stem into the chambers 48 and 41. When lubricating oil is used as the hydraulic fluid a slight leakage of the same in the opposite (downward) direction past this sealing element 93 is desirable to provide lubrication for the valve stem in its guide bushing. The pinion 79 operates in an enlargement 95 of the bore 91 and is thrustably supported between a shoulder at the lower end of this enlargement and a washer 97 which abuts the lower end of the bushing 49. A transverse slot 99 is provided in the lower end of the bushing 49 to vent the interior of this bushing below the plunger piston portion to the longitudinal slot 67, thereby insuring against any interference with plunger operation due to suction or build-up of leakage fluid pressure which might otherwise occur at this point.

The lower section 23 of the gas valve housing seats at its lower end against a suitable gasket 101 which lines the tapered lower end of the cylinder head opening 27, and is held in place by abutment of its upper end with the lower end of the upper housing section 21. The lower end of the lower housing section 23 is hollow and terminates in a seat for the gas valve 53. Openings 103 connect the interior of this housing lower end with a gas fuel receiving space 107 defined by the wall of the cylinder head opening 27 and a peripheral recess 105 formed intermediate the ends of the housing section 23. Gas fuel is conducted to this space 107 through a passage 109 formed in the head and connecting with a pipe 111 leading from the gas accumulator 11 (Figures 1 and 8) serving that engine cylinder.

The stem 59 of the gas valve 53 is guided in the lower housing section 23 by a bushing 113 having an external flange 115 intermediate its ends which seats in the bottom of a spring chamber 117. The upper end of the valve stem 59 carries a spring retainer washer 119 fixed thereto in any suitable manner as by tapered split locks 121 which engage a peripheral groove 123 on the stem. A helical spring 125 compressed between the bushing flange 115 and the retainer washer 119 serves to effect return of the gas valve 53 to its seated position as shown after each operating stroke. The upper and lower sections 21 and 23 of the gas valve housing are provided adjacent their opposing ends with external grooves in which are located "O-ring" packings of rubber or equivalent soft resilient material to seal against escape of gas from the space 107. Connected to opposite sides of the upper housing section 21 are a high pressure hydraulic fluid line 127 and a hydraulic fluid supply line 129. Each of these lines communicate with the fluid receiving chamber 41 by suitable passages (not shown) extending through the wall of the upper housing section head portion 37, and between the delivery end of the fluid supply line 129 and its connecting passage in the housing head portion 37 there is provided a suitable spring biased check valve 131. This check valve serves to permit flow of hydraulic fluid from the supply line 129 only in the direction inwardly of the chamber 41 and may be of any suitable design for this purpose, it being preferable, however, that this check valve be a unit separate from the gas valve housing in order that the connections of the lines 127 and 129 be reversible with respect to different sides of the gas valve housing head portion 37 to permit interchangeability of cylinder units between bank positions on the engine.

As shown in Figure 5, the gas valve actuating unit includes a housing having an upper or head portion 141 which bolts to the outer face 29 of the engine cylinder head and has a hollow depending portion 143 which inserts in an opening 145 provided in the upper wall of the cylinder head. The lower end of the hollow portion 143 has a tapered periphery which seats against and is sealed by a gasket 147 which lines the tapered entrance to the opening 145. The side walls of the hollow portion 143 are peripherally relieved for substantially their full length as indicated at 149 to insulate them from the cylinder head and adjacent its lower end the hollow portion is provided with a plurality of grooves 151 which serve as a heat dam against transfer of heat upwardly of the hollow housing portion from the engine combustion chamber 33. Mounted within the hollow portion 143 and separated from the inner walls thereof by an annular space 158 is a bushing 153, whose lower end seats against a shoulder 155 defining the bottom end of the housing interior, and whose upper end is in abutment with a downwardly open cup-shaped plug 157 in the upper end of the head portion 141. The bushing 153 forms a working cylinder for an actuating plunger 159, and is provided therefor with a lower bore 161 and a smaller upper bore 163. The actuating plunger 159 is in the form of a differential piston, having a head portion 165 operating in the bore 161 and a stem portion 167 operating in the upper bore 163. The stem portion 167 is made hollow as shown with its upper end open to the upper bore 163 and is provided intermediate its ends with a side port 169 which is normally open to the lower bore 161, as when the parts are in their positions shown in Figure 5, but which is closed off by the bore 163 as the plunger moves upwardly in the bushing. The annular space 171 between the stem portion 167 and the lower bore 161 is normally in communication with the annular space 158 by means of a relief port 173 provided in the side wall of the bushing, but with continued upward travel of the actuating plunger this port is closed off by the head portion 165 of the plunger, causing hydraulic fluid to be trapped in the upper portion of the space 171 and form a hydraulic stop to limit further upward movement of the actuating plunger. A helical spring 175 compressed between the upper end of the bushing space 171 and the head portion 165 serves to return the actuating plunger after each stroke.

The lower face of the actuating plunger head portion is provided with a central recess 177, and communicating with this recess is a restricted passage 179 leading upwardly through the lower end of the housing from the engine combustion chamber 33. Suitable packing rings 181 are provided on the periphery of the plunger head portion 165 to seal against escape of air and combustion gases from the combustion chamber into the space 171. Likewise, a suitable gasket 183 is provided to seal against the escape of gases past the lower end of the bushing and into the space 158, and an "O-ring" packing 187 of soft rubber or the like is provided between the periphery of the bushing upper end and the housing head portion 141.

The upper end of the bushing bore 163 connects with the interior of the plug 157, and the latter is provided with a plurality of transverse ports 189 which lead outwardly therefrom to an annular space 191 formed between the reduced lower end of the plug 157 and the threaded opening therefor in the housing head portion 141. Connected to one side of the actuator for communication with the annular space 191, through a transverse passage (not shown) in the housing head portion 141, is the high pressure hydraulic fluid delivery line 127 leading to the adjacent later firing cylinder. The hydraulic fluid return conduit system 73 is also connected to the housing head portion 141 by an adapter having a passage 201 which is in communication with a drilled passage 203 leading from the upper end of the housing space 158.

During operation of each engine cylinder unit, compression pressure built up in the combustion chamber during the compression stroke is applied to the lower end of the actuating plunger head portion 165, and when the compression pressure reaches a suitable value (in the order of 75 p. s. i.) the actuating plunger begins to move against its spring 175. This occurs, as shown by the engine timing diagram of Figure 7, at approximately forty-five degrees of crankshaft rotation before the piston in that engine cylinder reaches its top dead center position. During the initial upward movement of the actuating plunger the hydraulic fluid in the stem portion 167 flows out through the port 169, space 171, port 173, space 158 and passage 203 to the hydraulic fluid return system 73. After the port 169 closes the fluid continues to be displaced from the space 171 through the port 173 until the actuating plunger head portion 165 closes this port 173 and causes fluid to be trapped in the upper end of the bushing space 171 and prevent further upward travel of the actuating plunger. This hydraulic stop action occurs before the plunger return spring 175 is compressed to a solid condition. Immediately after closure of the first relief port 169, which occurs at approximately thirty-five degrees before top dead center, the further upward movement of the actuating plunger causes pressure to be imposed on the hydraulic fluid within the stem portion 167, upper bushing bore 163, plug 157, passages 189 and annular space 191, with the result that fluid is forced to flow through the high pressure delivery line 127 to the gas valve housing of the adjacent later firing cylinder.

This hydraulic fluid flowing into the upper body section 21 of such adjacent cylinder gas valve unit operates against the driven plunger 51 therein and forces it to move downwardly, carrying with it the gas valve 53 in opposition to the valve spring 125, whereby the combustion chamber of the engine cylinder is opened to the flow of gas fuel from the accumulator 11, through the pipe 111, cylinder head gas passage 109, space 107, lower housing ports 103 and the lower end of the lower housing section 23. After the gas valve 53 has opened sufficiently for the helical upper edge 61 of its plunger 51 to uncover the relief port 65 further opening movement of the gas valve ceases and the high pressure hydraulic fluid escapes through this port, passages 69 and 71 to the fluid return system 73. The extent of opening travel of the gas valve before this pressure relief occurs is adjustable by means of the rack screw 81 in the manner previously described.

Although relatively high pressures (of the order of 1,000 p. s. i.) are developed in the hydraulic stop chamber formed by the upper end of the actuator bushing space during each valve opening operation, the pressure of the hydraulic fluid does not exceed approximately 300 p. s. i. at the actuator end and approximately 150 p. s. i. at the valve end of the delivery line 127 interconnecting the gas valve and actuating units. This results from the fact that at the valve end the plunger piston portion 55 functions as a relief valve in uncovering the port 65 at pressures above 150 p. s. i. and at the actuator end the displacement or "spilling off" of fluid through the port 169 during the initial portion of the upward stroke of the plunger effects a gradual application of pressure to the fluid above the plunger. Transmission of shock waves or pressure surges by the fluid are accordingly effectively damped or avoided.

Referring again to the timing diagram of Figure 7, at approximately twenty-five degrees after top dead center the combustion chamber pressure drops to a value (of the order of 200 p. s. i.) sufficiently low that the fluid pressure in the hydraulic stop chamber of the actuator unit overbalances the combustion chamber pressure acting on the actuating plunger head portion, thereby initiating the return stroke of the actuating plunger. Since only a relatively small movement in this direction effects a relatively large decrease in hydraulic fluid pressure in the delivery line 127, the gas valve and its plunger immediately begin their return movement to the positions shown in Figure 4. This return movement is accelerated by the then increasing combustion chamber pressure acting against the gas valve in the valve closing direction, coupled with the decreasing combustion chamber pressure opposing the return movement of the actuator plunger, and hence the valve completes its closing rather promptly.

Make-up hydraulic fluid from the supply line 129 (Figures 1–3, 6 and 8) flows into the head portion 37 (Figure 4) of the valve unit upper housing portion 21 as the pressure in the latter decreases sufficiently with return of actuating plunger to permit the supply line fluid pressure to open the check valve 131. The pressure delivery line 127 as well as the various passages and chambers in the valve and actuator units are thereby maintained full of fluid, preparatory to their next valve operating stroke; and during this period the actuating unit ports 169 and 173 are open and hydraulic fluid flows in the reverse direction, i. e. from gas valve unit to its actuator unit. This results in the two-fold effect of driving any air or combustion gas entrained fluid out of the valve-to-actuator circuit, and of utilizing the fluid for internally cooling the actuator unit. By reason of this supply fluid being introduced at the valve unit end of the circuit, the advancement of air entrained fluid from the actuator end (at which leakage into the system is most apt to occur as the result of combustion gases escaping past the actuating plunger seal rings 181) is effectively repulsed. A relatively low fluid supply line pressure (of the order of 45 p. s. i.) has been found adequate for this purpose.

Figure 6 shows the gas valve and actuator units of the upper row of engine cylinders interconnected by their respective fluid delivery lines AB–127–1, BC–127–1, etc. The designation of these lines in this and Figures 1 and 8 by the prefixes "AB," "BC," etc. is used to identify them with the engine cylinders in which their valve and actuator units are located, and the suffixes "1," "2," etc. refer to the engine cylinder rows with which they are associated. As will be understood from Figure 8, the valve units of each row are actuated as described above by the actuator units of the adjacent earlier firing cylinders of the same row.

Diagrammatically also shown in Figure 8 are the fluid return system 73, fluid supply system 129, and the gas fuel supply manifolding 12. The hydraulic fluid is delivered to the supply system 129 from an external source by a suitable transfer pump and return thereto by means of the return conduit system 73 and a sump. The check valves 131 serve to prevent fluid pressure in a high pressure delivery line 127 associated with one pair of cylinders from being transmitted into the supply system 129 and interfering with the normal operation of the gas valve and actuator unit associated with another pair of cylinders. Each accumulator tank 11 is fed from the gas supply manifolding 12 through a flow restriction indicated at 220 which insures against one engine cylinder "starving" another in operation.

Although the invention has been described and illustrated as applied to the operation of the gas fuel poppet valves of a particular design of internal combustion engine, various other uses and modifications coming within the scope of the following claims will readily suggest themselves to persons skilled in the art.

I claim:

1. In a fluid pressure operating system, an actuated member, an actuating member, means forming a hydraulic fluid column in thrust transmitting relation between said members and including a cylinder at each end of said column, said actuating member being movable in the cylinder at its end of the column to cause a corresponding movement of the actuated member in the other cylinder, each of said cylinders having a fluid pressure escape port, said escape port in the actuating member cylinder being closable by the actuating member after a predetermined movement of the actuating member, said escape port in the actuated member cylinder being opened by the actuated member after a predetermined movement of the actuated member in response to movement of said actuating member, and means for introducing fluid under pressure to the actuated member end of said column while said actuated member port is closed and said actuating member port is open.

2. In a hydraulic system for operating internal combustion engine valves and the like, an actuator unit including a plunger having respective large and small diameter end portions, means forming large and small diameter working cylinders for said plunger portions and a shoulder intermediate said cylinders, said small diameter cylinder having a fluid inlet and outlet opening, said plunger having a chamber in continuous communication with said opening and a port in the side of said plunger small diameter end portion for the passage of fluid from said chamber into the large diameter cylinder, said port being closable by said shoulder as said plunger large diameter end portion is advanced toward said shoulder, said large diameter cylinder having a fluid escape port spaced from said shoulder and closable by said plunger large diameter end portion subsequently to the closure of said first named port during said advancement of the plunger.

3. In a hydraulic system for operating internal combustion engine valves and the like, an actuator unit including a housing having walls provided with an inlet and an outlet for the passage of hydraulic fluid, a bushing within the housing having walls spaced from the housing walls to form a chamber externally of the bushing, said bushing having large and small diameter bores coaxial with each other and terminating at their adjacent ends in a shoulder, said small diameter bore being in continuous communication with said outlet, and a plunger having different diameter portions slidably fitting said bores, said small diameter portion of the plunger having an internal chamber continuously open to said small diameter bore above the plunger and having a port closable by said shoulder with upward movement of the plunger in the bushing but normally connecting said internal chamber with the large diameter bore of the bushing above the large diameter portion of the plunger, said large diameter bore having a port spaced below said shoulder and communicating with said external chamber but closable by said plunger large diameter portion with continued upward movement of the plunger beyond that necessary to effect closing of said first named port.

4. In a hydraulic operating system for internal combustion engine valves and the like, a source of hydraulic fluid under pressure, an actuator unit, a valve unit, a conduit for conducting hydraulic fluid between said units, said valve unit including a valve, valve biasing means, a reciprocable plunger connected to move said valve against said biasing means, and means forming a working cylinder for said plunger, said cylinder having an inlet continuously open to the passage of fluid from said source and a fluid escape port controlled by said plunger, said plunger being normally held in closing relation with said escape port by said biasing means but movable during its normal valve opening stroke to a position uncovering said escape port in response to movement of fluid through said conduit from said actuator unit.

5. In a hydraulic valve operating system for a multi-cylinder engine, an actuator unit and an associated valve unit for each engine cylinder, hydraulic fluid conduits connecting the actuator units with the respective valve units, each said actuator unit including a plunger, a plunger cylinder having an inlet for engine combustion chamber pressure and a bore slidably receiving the plunger and connecting said inlet to said conduit, biasing means urging said plunger toward the inlet end of its plunger cylinder and means forming a cooling chamber about said plunger, said plunger having an internal chamber open to the conduit end of its plunger cylinder and a fluid escape port normally open to the flow of fluid from said internal chamber to said cooling chamber but closable by the bore of its plunger cylinder after a predetermined advancement of the plunger toward said conduit end, each said valve unit including a plunger and a plunger cylinder, said valve unit plunger cylinder being continuously open at one end to receive fluid from said conduit and having a fluid escape port normally covered by the valve unit plunger, said last named port being uncovered by the valve unit plunger after a predetermined movement of the valve unit plunger in the direction away from the conduit end of its plunger cylinder, and means for introducing hydraulic fluid to each of said conduits in replenishment of that lost by leakage and escape through said plunger cylinder ports.

6. The invention defined in claim 5, wherein said replenishment fluid is introduced to the system at the valve unit ends of said conduits.

7. In a hydraulic valve operating system for internal combustion engines, an actuator unit including a reciprocable plunger having a head portion and a reduced portion extending therefrom, means forming working cylinders for said plunger portions and a shoulder between said cylinders, a hydraulic fluid delivery line connected to the working cylinder for said plunger reduced portion, said plunger reduced portion having an internal chamber in continuous communication with said delivery line and having a fluid outlet port connecting said internal chamber with the periphery of said reduced portion, said port being spaced from said plunger head portion, said head portion working cylinder having a fluid outlet port spaced from said shoulder, and biasing means normally positioning said plunger to maintain communication between said internal chamber and cylinder port via said reduced portion port and said head portion working cylinder, said reduced portion and cylinder ports being located for sequential closing by said shoulder and head portion respectively during movement of the plunger in opposition to said biasing means.

8. In a hydraulic valve operating system for internal combustion engines, an actuator unit including a reciprocable plunger having a head portion and a reduced portion, means forming longitudinally adjacent working cylinders for said plunger portions and a shoulder between said cylinders, a hydraulic fluid delivery line connected to the cylinder for said reduced portion, said reduced portion having an internal chamber in continuous communication with said delivery line and having a port closable by said shoulder but normally connecting said internal chamber with the periphery of said reduced portion within said head portion cylinder, biasing means opposing movement of the plunger head portion toward said shoulder, said head portion cylinder having a fluid escape port closable by said head portion after closure of said first named port during movement of the plunger against said biasing means, said head portion cylinder extending above said last named port to form a hydraulic stop chamber limiting said movement of the plunger.

References Cited in the file of this patent

UNITED STATES PATENTS

| | | |
|---|---|---|
| 1,361,109 | Spohrer | Dec. 7, 1920 |
| 1,367,037 | Gall | Feb. 1, 1921 |
| 1,623,177 | Funderburk | Apr. 5, 1927 |
| 1,994,223 | Leveque | Mar. 12, 1935 |
| 2,112,466 | Maloon | Mar. 29, 1938 |
| 2,575,955 | Hatch | Nov. 20, 1951 |
| 2,602,434 | Barnaby | July 8, 1952 |

FOREIGN PATENTS

| | | |
|---|---|---|
| 350,157 | Great Britain | June 11, 1931 |
| 748,426 | France | Apr. 18, 1933 |